United States Patent
Northrop et al.

(10) Patent No.: US 10,137,768 B2
(45) Date of Patent: Nov. 27, 2018

(54) AIR DELIVERY SYSTEM FOR A FARM MACHINE

(71) Applicant: Eaton Corporation, Cleveland, OH (US)

(72) Inventors: Kurt Northrop, Kalamazoo, MI (US); Daniel Ouwenga, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 68 days.

(21) Appl. No.: 15/216,076

(22) Filed: Jul. 21, 2016

(65) Prior Publication Data
US 2016/0325618 A1    Nov. 10, 2016

Related U.S. Application Data

(63) Continuation of application No. PCT/US2015/012233, filed on Jan. 21, 2015.
(Continued)

(51) Int. Cl.
*B60K 11/06* (2006.01)
*F01N 3/05* (2006.01)
(Continued)

(52) U.S. Cl.
CPC .............. *B60K 11/06* (2013.01); *A01D 41/12* (2013.01); *F01N 3/055* (2013.01); *F01N 11/002* (2013.01);
(Continued)

(58) Field of Classification Search
CPC ...... F01N 3/055; F01N 11/002; F01N 13/009; F01N 2260/022; F01N 2260/26;
(Continued)

(56) References Cited

U.S. PATENT DOCUMENTS

| 3,748,836 A | 7/1973 | Bachle |
| 3,820,327 A * | 6/1974 | Henault ................ F01N 3/2006 60/286 |

(Continued)

FOREIGN PATENT DOCUMENTS

| CN | 102597456 A | 7/2012 |
| DE | 10206066 A1 | 9/2002 |

(Continued)

OTHER PUBLICATIONS

International Search Report and Written Opinion for International Application No. PCT/US2015/012233 dated Apr. 28, 2015, 12 pages.
(Continued)

*Primary Examiner* — Audrey K Bradley
(74) *Attorney, Agent, or Firm* — RMCK Law Group PLC (57) ABSTRACT

An air delivery system for a farm machine according to the present disclosure can include a first rotary blower and a first aftertreatment enclosure. The first rotary blower can include a housing and have a first rotor and a second rotor rotatably disposed in the housing. The first and second rotors can have meshed lobes for transporting air from an inlet port to an outlet port. A first aftertreatment enclosure can be configured on the farm machine and include a first inlet, a second inlet and an outlet. The first inlet can receive engine exhaust from an engine of the farm machine. The second inlet can receive air from the rotary blower. A temperature of the engine exhaust can be reduced upon exiting the first aftertreatment enclosure through the outlet.

17 Claims, 9 Drawing Sheets

Related U.S. Application Data (60) Provisional application No. 61/931,250, filed on Jan. 24, 2014.

(51) Int. Cl.
    *F01N 13/00*     (2010.01)
    *A01D 41/12*     (2006.01)
    *F04C 2/18*     (2006.01)
    *F01N 11/00*     (2006.01)

(52) U.S. Cl.
    CPC .............. *F01N 13/009* (2014.06); *F04C 2/18* (2013.01); *F01N 2260/022* (2013.01); *F01N 2260/26* (2013.01); *F01N 2590/08* (2013.01); *Y02T 10/20* (2013.01)

(58) Field of Classification Search
    CPC ....... F01N 2590/08; F04C 2/18; A01D 41/12; B60K 11/06; Y02T 10/20
    See application file for complete search history.

(56) References Cited

U.S. PATENT DOCUMENTS

| | | | |
|---|---|---|---|
| 3,967,929 A | | 7/1976 | Tamazawa et al. |
| 4,027,478 A | | 6/1977 | Masaki et al. |
| 4,564,346 A | | 1/1986 | Kimmons et al. |
| 5,934,235 A | * | 8/1999 | Astner .................. F01L 1/0532 123/193.3 |
| 5,987,885 A | * | 11/1999 | Kizer ........................ F01N 3/05 422/169 |
| 6,358,109 B1 | * | 3/2002 | Neisen .................... B63H 21/32 440/89 B |
| 7,513,107 B2 | | 4/2009 | Lehmann et al. |
| 7,913,488 B2 | | 3/2011 | Schick et al. |
| 8,429,902 B2 | | 4/2013 | Kondou |
| 8,539,769 B2 | | 9/2013 | Hansen et al. |
| 8,813,492 B2 | | 8/2014 | Hansen et al. |
| 9,032,715 B2 | * | 5/2015 | Bruns ...................... F01N 1/14 60/274 |
| 9,683,521 B2 | | 6/2017 | Mahalatkar et al. |
| 2010/0043430 A1 | | 2/2010 | Dehart |
| 2011/0083647 A1 | | 4/2011 | Hansen et al. |
| 2011/0138774 A1 | * | 6/2011 | Pursifull ................. F01N 3/055 60/273 |
| 2013/0174546 A1 | | 7/2013 | Yacoub |

FOREIGN PATENT DOCUMENTS

| | | | | |
|---|---|---|---|---|
| DE | 102010011293 A1 | | 9/2011 | |
| EP | 1930188 A1 | | 6/2008 | |
| EP | 2372121 A1 | | 10/2011 | |
| EP | 2982845 A1 | | 2/2016 | |
| JP | 61-57118 U | | 4/1986 | |
| JP | 05010282 A | * | 1/1993 | |
| JP | H0510282 A | | 1/1993 | |
| JP | 2002129933 A | | 5/2002 | |
| JP | 2005220778 A | * | 8/2005 | ............. F01N 3/055 |
| WO | 2005045208 A1 | | 5/2005 | |
| WO | 2011006844 A1 | | 1/2011 | |
| WO | 2012167248 A2 | | 12/2012 | |

OTHER PUBLICATIONS

European Search Report for EP Application No. 15740047 dated Sep. 20, 2017, 8 pages.
European Search Report for EP Application No. 15740776 dated Sep. 15, 2017, 7 pages.
Chinese Office Action for Chinese Application No. 201580005481.8 dated Apr. 28, 2018, 9 pages.
U.S. Appl. No. 15/216,213, filed Jul. 21, 2016, Northrop.

* cited by examiner

AIR DELIVERY SYSTEM FOR A FARM MACHINE

CROSS-REFERENCE TO RELATED APPLICATIONS

This application is a continuation of International Application No. PCT/US2015/012233 filed on Jan. 21, 2015, which claims the benefit of U.S. Patent Application No. 61/931,250 filed on Jan. 24, 2014. The disclosures of the above applications are incorporated herein by reference.

FIELD

The present disclosure relates generally to farm machines and more particularly to an air delivery system including a supercharger that delivers air to an aftertreatment enclosure configured on a farm machine.

BACKGROUND

Over time farm equipment manufacturers have been required to meet tighter emission standards. Farm equipment manufacturers have responded to these elevated emission standards by improving farm equipment technology including engine technology. In some instances, a by-product of this improved technology is an engine that ultimately emits exhaust having higher temperatures than previously observed.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An air delivery system for a farm machine according to the present disclosure can include a first rotary blower and a first aftertreatment enclosure. The first rotary blower can include a housing and have a first rotor and a second rotor rotatably disposed in the housing. The first and second rotors can have meshed lobes for transporting air from an inlet port to an outlet port. The rotary blower can further include a first rotor shaft and a second rotor shaft rotatably supported by the housing and having first and second rotors, respectively, fixed for rotation therewith. A first aftertreatment enclosure can be configured on the farm machine and include a first inlet, a second inlet and an outlet. The first inlet can receive engine exhaust from an engine of the farm machine. The second inlet can receive air from the rotary blower. A temperature of the engine exhaust can be reduced upon exiting the first aftertreatment enclosure through the outlet.

According to additional features, the inlet port can extend along an inlet port axis. The outlet port can extend along an outlet port axis. The inlet port axis and the outlet port axis can be parallel. The inlet port can be defined by an inlet cylinder provided on the housing. The inlet port can define a circular cross section. The outlet port can be defined by an outlet cylinder provided on the housing. The outlet port can define a circular cross section. The housing can comprise an eyelet extending therefrom. The eyelet can define an opening having an axis that is parallel to the inlet port axis and the outlet port axis. In one configuration the first aftertreatment enclosure can further comprise a temperature sensor and a vent. The vent can be configured to release air received from the rotary blower from the first aftertreatment enclosure.

According to other features, the air delivery system can further comprise a second aftertreatment enclosure that receives (i) air from the first rotary blower and (ii) engine exhaust. A temperature of the engine exhaust can be reduced upon exiting the second aftertreatment enclosure. In another configuration, the air delivery system can further comprise a second rotary blower and a second aftertreatment enclosure. The second aftertreatment enclosure can receive (i) air from the second rotary blower and (ii) engine exhaust. A temperature of the engine exhaust can be reduced upon exiting the second aftertreatment enclosure. In one example the farm machine can comprise a combine.

An air delivery system for a farm machine according to another example of the present disclosure can include a first rotary blower and a first aftertreatment enclosure. The first rotary blower can include a housing and have a first rotor and a second rotor rotatably disposed in the housing. The first and second rotors can have meshed lobes for transporting air from an inlet port to an outlet port. The rotary blower can further include a first rotor shaft and a second rotor shaft rotatably supported by the housing and having first and second rotors, respectively, fixed for rotation therewith. A first aftertreatment enclosure can be configured on the farm machine. The first aftertreatment enclosure can include (i) a first inlet that receives engine exhaust from an engine of the farm machine, (ii) a second inlet that receives air from the rotary blower, (iii) a first outlet that engine exhaust exits from the first aftertreatment enclosure, and (iv) a second outlet that releases air received from the rotary blower from the first aftertreatment enclosure. A temperature of the engine exhaust can be reduced upon exiting the first aftertreatment enclosure through the first outlet.

According to additional features, an engine exhaust duct can carry engine exhaust into the first aftertreatment enclosure through the first inlet and carry engine exhaust out of the first aftertreatment enclosure through the first outlet. The inlet port can extend along an inlet port axis. The outlet port can extend along an outlet port axis. The inlet port axis and the outlet port axis can be parallel. The housing can comprise an eyelet extending therefrom. The eyelet can define an opening having an axis that is parallel to the inlet port axis and the outlet port axis.

According to other configurations the air delivery system can further comprise a second aftertreatment enclosure that receives (i) air from the first rotary blower and (ii) engine exhaust. A temperature of the engine exhaust can be reduced upon exiting the second aftertreatment enclosure. In another configuration, the air delivery system can further include a second rotary blower and a second aftertreatment enclosure. The second aftertreatment enclosure can receive (i) air from the second rotary blower and (ii) engine exhaust. A temperature of the engine exhaust can be reduced upon exiting the second aftertreatment enclosure. In one example, the farm machine can comprise a combine.

A method of cooling an engine exhaust of a farm machine can include providing a first rotary blower on the farm machine. A first aftertreatment enclosure can be provided on the farm machine. The first aftertreatment enclosure can have a first inlet, a second inlet, a first outlet and a second outlet. Engine exhaust can be delivered into the first inlet and out of the first outlet. Air from the first rotary blower can be delivered into the second inlet and out of the second outlet. A temperature of the engine exhaust can be reduced upon exiting the first aftertreatment enclosure through the first outlet.

According to other features the method can further include providing a second aftertreatment enclosure on the farm machine. Engine exhaust can be delivered from the first aftertreatment enclosure into the second aftertreatment enclosure on the farm machine. Air can be delivered from the first rotary blower into the second aftertreatment enclosure. A temperature of the engine exhaust can be reduced upon exiting the second aftertreatment enclosure.

BRIEF DESCRIPTION OF THE DRAWINGS

The present disclosure will become more fully understood from the detailed description and the accompanying drawings, wherein.

DETAILED DESCRIPTION

Figure 1:
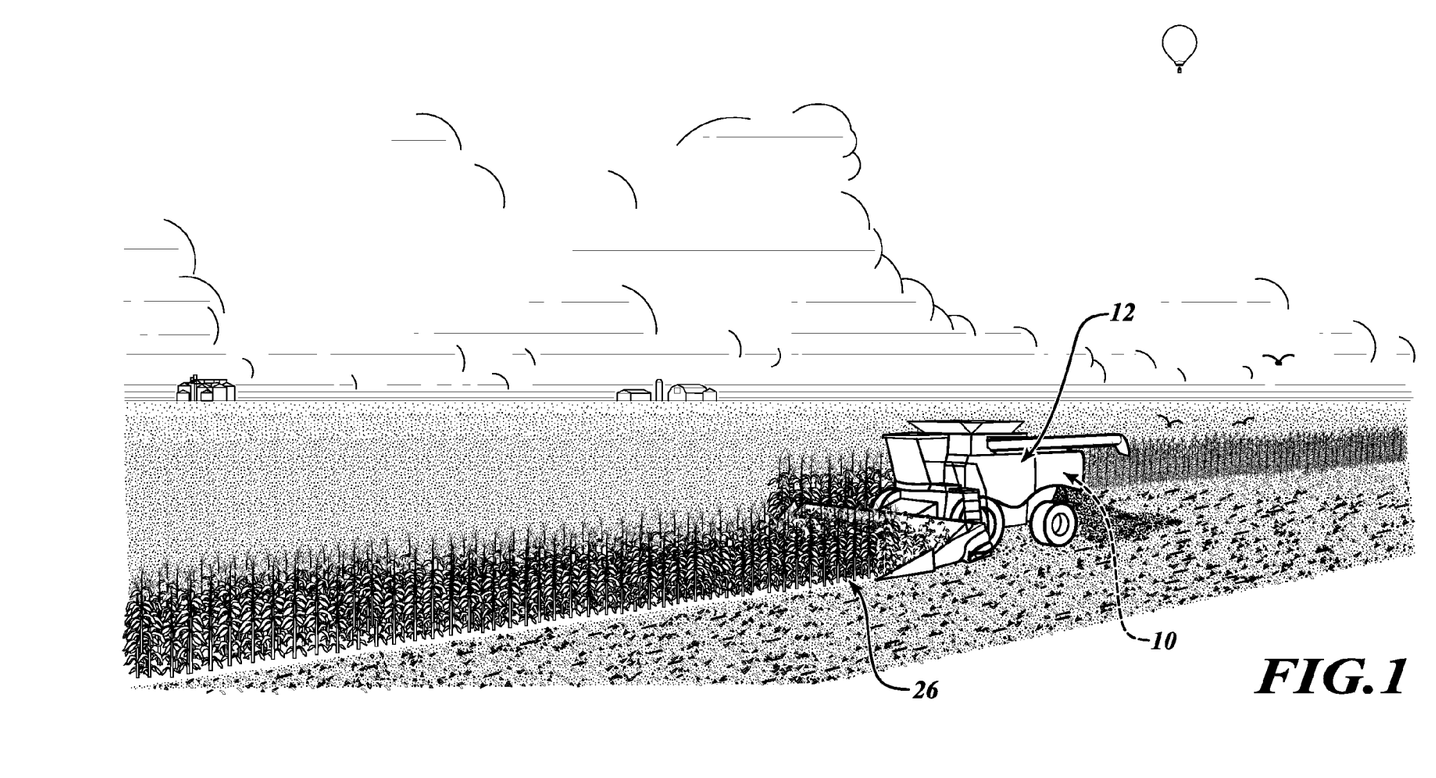
FIG. 1 is an environmental view of a farm machine incorporating an air delivery system according to one example of the present disclosure.
Figure 2:
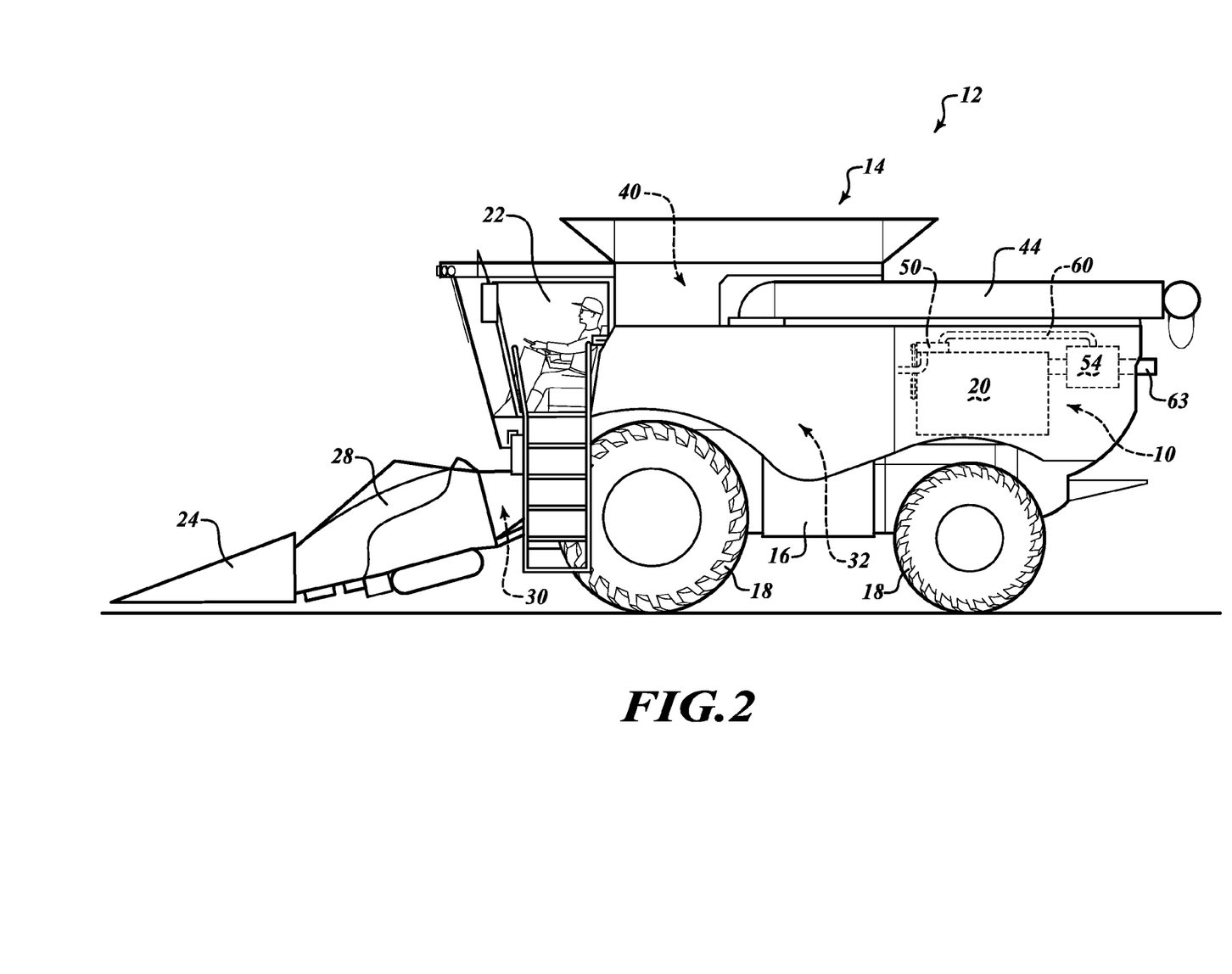
FIG. 2 is a side view of the farm machine of FIG. 1 that incorporates an air delivery system according to one example of the present disclosure.

With initial reference to FIGS. 1 and 2, an air delivery system constructed in accordance to one example of the present disclosure is shown and generally identified at reference numeral 10. The air delivery system 10 is shown operatively configured on a farm machine 12. The farm machine 12 described herein is in the form of a combine harvester 14. It will be appreciated however that the air delivery system 10 according to the present disclosure can be configured for use in other farm machines including various other harvesting equipment, hay making machines, loading machines, tractors and the like. As will become appreciated from the following discussion, the air delivery system 10 according to the present disclosure can reduce a temperature of engine exhaust ultimately emitted from the farm machine 12.

The exemplary combine harvester 14 generally includes a chassis 16 having wheels 18 that engage the ground. An engine 20 provides rotatable motion onto the wheels 18. The wheels 18 therefore serve to propel the farm machine 12 along the ground. It will be appreciated that any combination of the front and rear wheels 18 may be configured as drive wheels and steering wheels. The operation of the combine harvester 14 is controlled from an operator cab 22. A harvesting head 24 is mounted on the front end of the combine harvester 14 and is configured to gather corn plants 26 growing in an agricultural field and strip the ears of corn from the plant stalks. The plant stalks, once stripped of their ears of corn, are left on the ground. The ears of corn are carried through the harvesting head 24 and rearward through a feederhouse 28. The feederhouse 28 supports the harvesting head 24 on the combine harvester 14. In other examples, the plant stalks can be cut from the ground and the entire corn plant can be fed into the harvesting head 24 for further processing.

A conveyor 30 carries the ears of corn to a combine crop processing assembly 32. The combine crop processing assembly 32 can include a number of components that further process the ears of corn. In one example, the crop processing assembly 32 includes a thresher, a separator and a cleaner. The thresher and separator can cooperate to remove the grain from the stalks and husks. The cleaner can include a sieve and a chaffer that separate the grain from dust and chaff. Once cleaned, the clean grain can be deposited in an auger conveyor located in the bottom of the combine harvester 14. The clean grain can be moved by a paddle conveyor into a grain tank 40. The combine harvester 14 can be periodically unloaded through an unloading auger 44. Other configurations may be provided.

Figure 3:
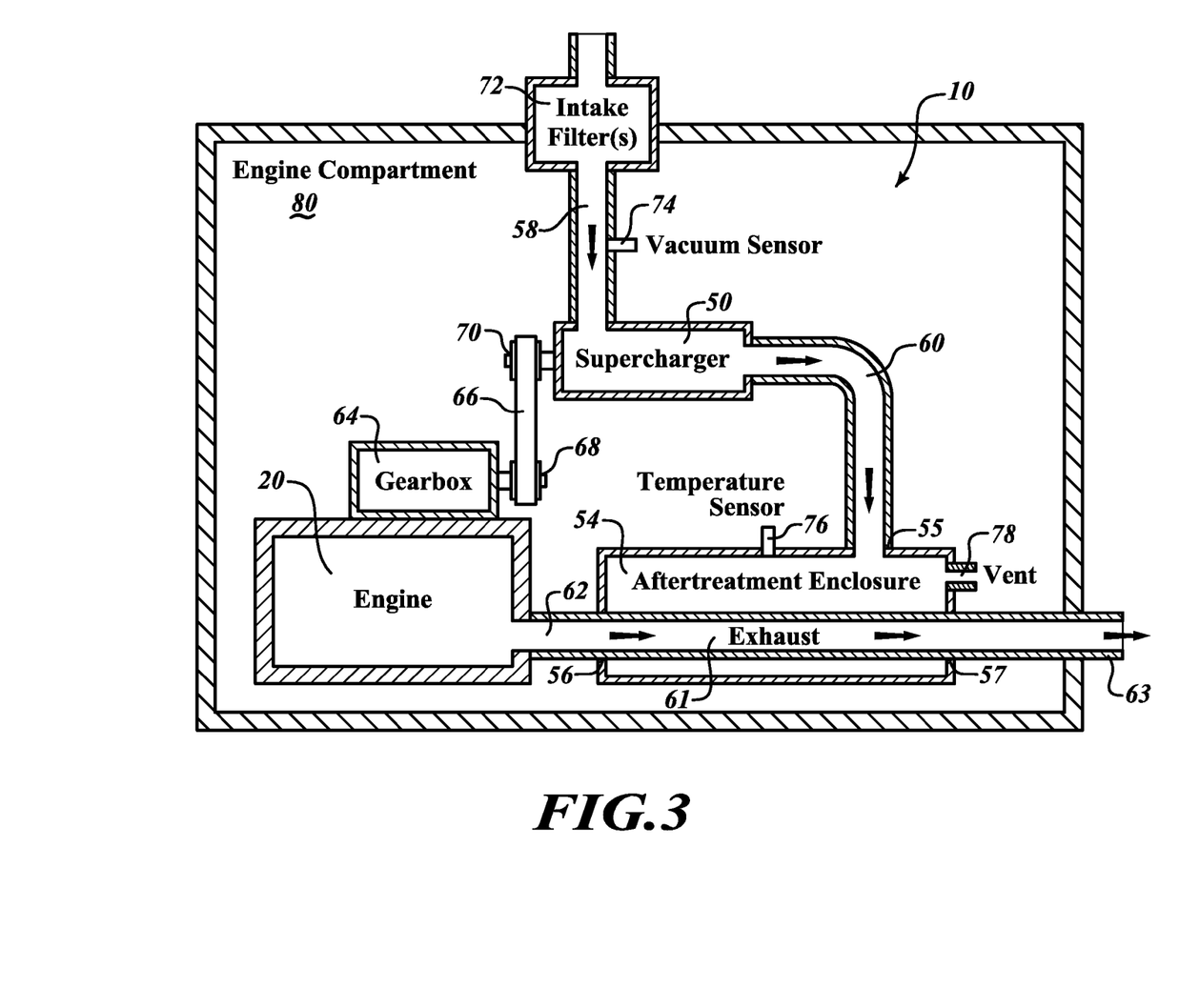
FIG. 3 is a schematic illustration of an air delivery system constructed in accordance to one example of the present disclosure.
Figure 4:
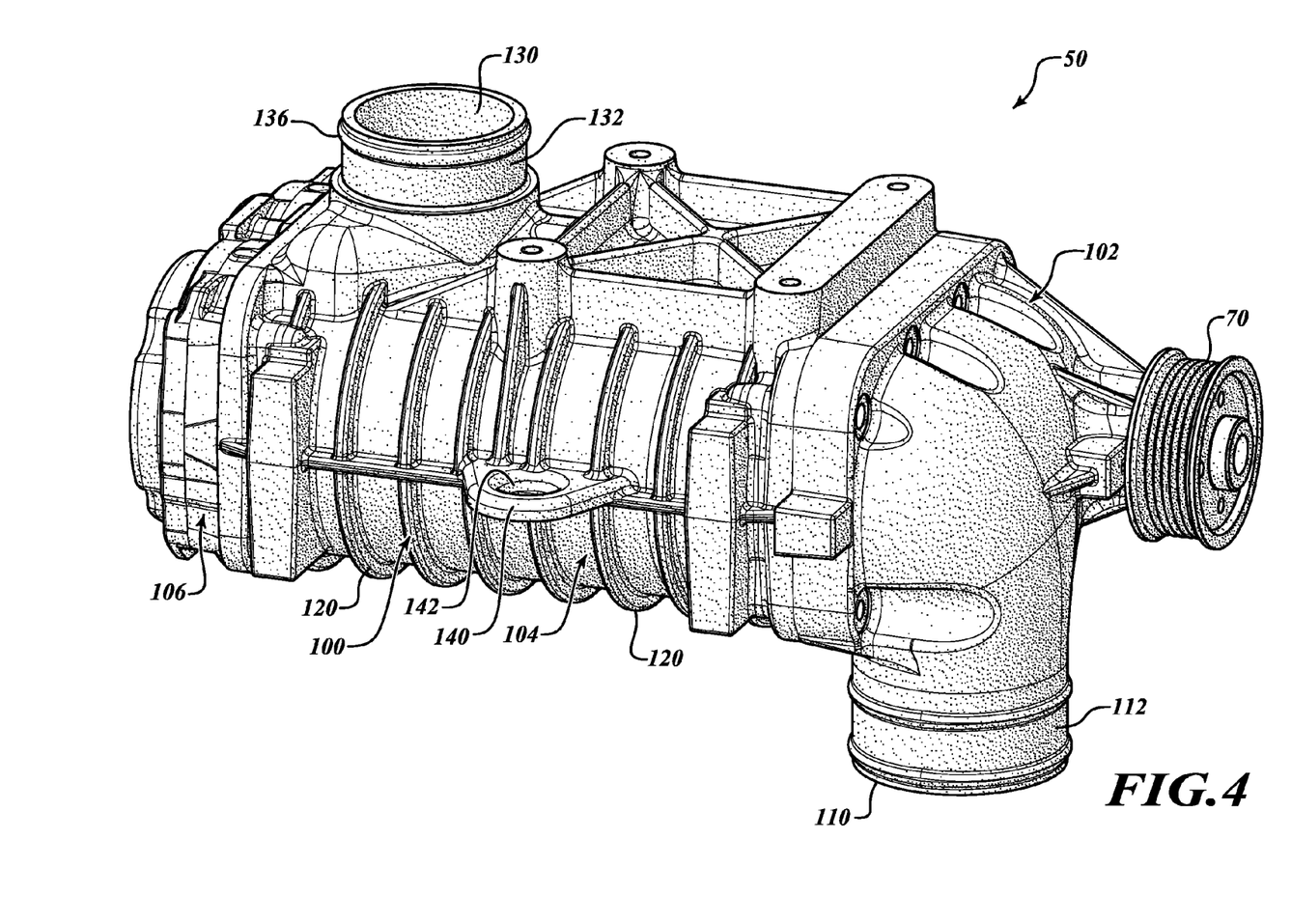
FIG. 4 is a front perspective view of an exemplary rotary blower of the air delivery system of FIG. 3.
Figure 5:
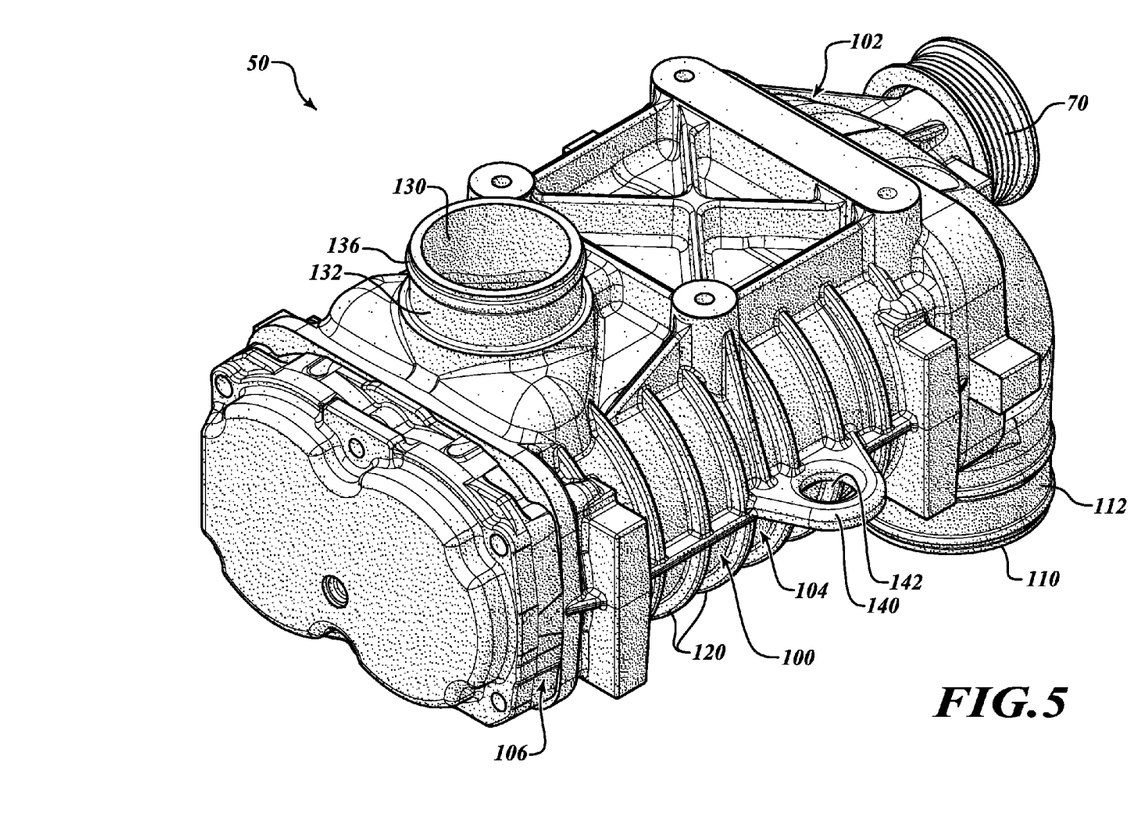
FIG. 5 is a rear perspective view of the exemplary rotary blower of FIG. 4.
Figure 6:
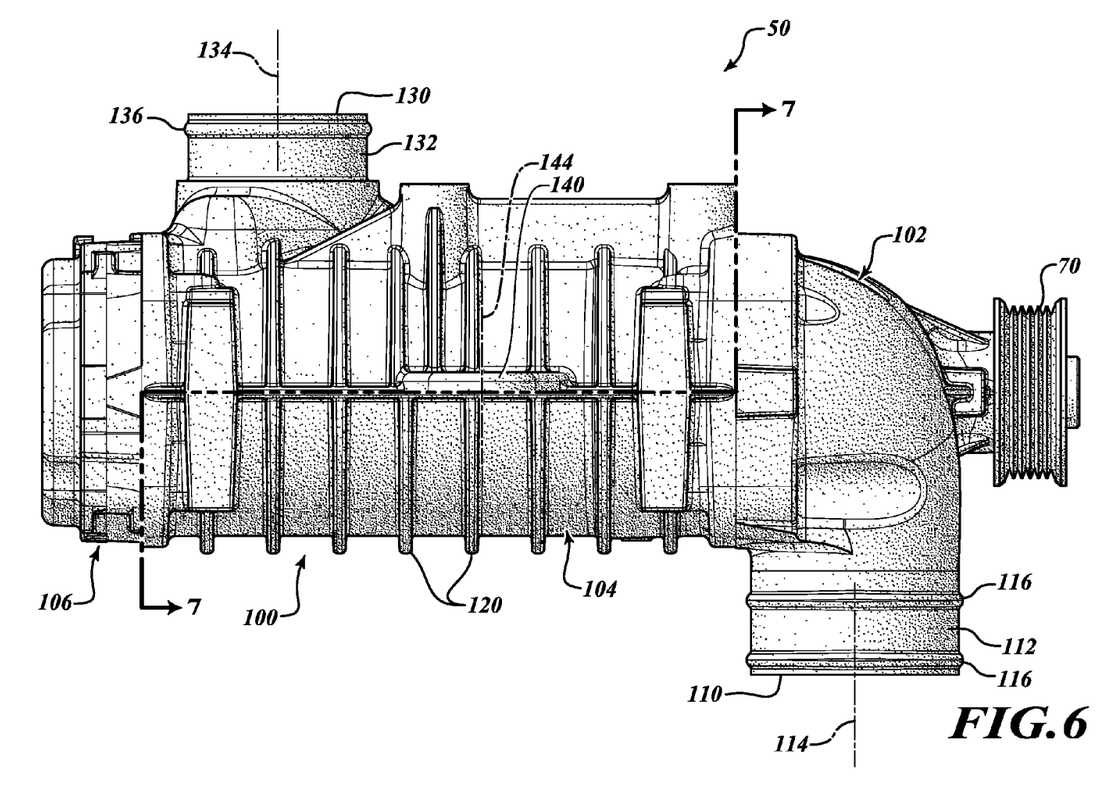
FIG. 6 is a side view of the exemplary rotary blower of FIG. 4.

With additional reference to FIG. 3, the air delivery system 10 according to one example of the present disclosure will be described. The air delivery system 10 can generally include a positive displacement rotary blower or supercharger 50 of the Roots type and an aftertreatment enclosure 54. The aftertreatment enclosure 54 can have a first inlet 55, a second inlet 56 and an outlet 57. The supercharger 50 can be configured to force air from an air intake duct 58 through a supercharger outlet duct 60 and into the aftertreatment enclosure 54 by way of the first inlet 55. As will become appreciated from the following discussion, the supercharger 50 is configured to force air into the aftertreatment enclosure 54. One exemplary flow rate is 350 cubic feet per minute (cfm) although other flow rates are contemplated. The temperature of the air being forced into the aftertreatment enclosure 54 by the supercharger 50 is cooler than a temperature of an exhaust 61 of the engine 20. The cooler air delivered from the supercharger 50 reduces the temperature of the exhaust 61.

An engine exhaust duct 62 can deliver engine exhaust from the engine 20 through the aftertreatment enclosure 54 and out of the combine harvester 14 through an engine exhaust outlet 63. In the example shown, the engine exhaust duct 62 enters the aftertreatment enclosure 54 at the second inlet 56 and exits the aftertreatment enclosure 54 at the outlet 57. The cooler air (relative to exhaust temperature exiting the engine 20 upstream of the aftertreatment enclosure 54) provided by the supercharger 50 will be forced against the engine exhaust duct 62 and through convection, will cause the temperature of the exhaust 61 to be reduced. As a result, the temperature of the exhaust 61 exiting the aftertreatment enclosure 54 through the engine exhaust duct 62 is less than the temperature of the exhaust 61 entering the aftertreatment enclosure 54. In this regard, the temperature of the exhaust exiting the combine harvester 14 at the exhaust outlet 63 is reduced compared to a temperature of the exhaust exiting the engine 20 upstream of the aftertreatment enclosure 54.

The supercharger 50 can be driven by a gearbox or power take off unit (PTU) 64 extending from the engine 20. A power transfer device such as a belt 66 can transfer a rotatable motion from a PTU pulley 68 driven by the PTU 64 to a supercharger pulley 70 arranged on the supercharger 50. Other mechanical arrangements may be incorporated for providing a rotatable input to the supercharger pulley 70.

An intake filter 72 can be configured upstream of the air intake duct 58. The intake filter 72 can filter ambient air flowing into the air intake duct 58. A vacuum sensor 74 can be provided on the air intake duct 58. The vacuum sensor 74 can be configured to measure a pressure in the air intake duct 58. A temperature sensor 76 can be provided on the aftertreatment enclosure 54. The temperature sensor 76 can be configured to measure a temperature in the aftertreatment enclosure 54. A vent 78 can be incorporated on the aftertreatment enclosure 54 that vents the aftertreatment enclosure 54 to ambient air. The air delivered from the supercharger 50 can exit the aftertreatment enclosure 54 through the vent 78. The aftertreatment enclosure 54 is sealed except for the vent 78. The air flow entering the aftertreatment enclosure 54 from the supercharger 50 has a greater pressure than ambient. In one example, the pressure in the aftertreatment enclosure 54 can be between 110 and 120 kilopascals (kPa). In general, atmospheric pressure can range between 95 and 105 kPa. As such, pressure in the aftertreatment enclosure 54 is higher than ambient. A pressure ratio of the aftertreatment enclosure 54 and atmospheric pressure can be about 1.1 to 1.2. In this regard, contaminants are inhibited from entering the aftertreatment enclosure 54 through the vent 78.

The vacuum sensor 74 and the temperature sensor 76 can be configured to communicate a signal to a controller (not specifically shown). The controller can be configured to make operational adjustments to the air delivery system 10 based on operational inputs including those provided by the vacuum sensor 74 and the temperature sensor 76. In the example shown, the air delivery system 10 is arranged within an engine compartment 80 although it will be appreciated that some or all of the components may be located elsewhere on the combine harvester 14.

With further reference now to FIGS. 4-7, the supercharger 50 will be further described. The supercharger 50 can generally include a supercharger housing 100 having a front housing portion 102, a central housing portion 104 and a rear housing portion 106. The front housing portion 102 can include an inlet port 110 defined by an inlet cylinder 112. The inlet port 110 can extend along an inlet port axis 114 (FIG. 6) and define a circular cross section. Mounting ribs 116 (FIG. 6) can extend around the inlet cylinder 112 for providing a mating structure for the air intake duct 58 (FIG. 3). The front housing portion 102 can provide mounting structure for the supercharger pulley 70.

The central housing portion 104 can include a plurality of cooling fins 120 extending therefrom. The central housing portion 104 can include an outlet port 130 defined by an outlet cylinder 132. The outlet port 130 can extend along an outlet port axis 134 (FIG. 6) and define a circular cross section. A mounting rib 136 can extend around the outlet cylinder 132 for providing a mating structure for the supercharger outlet duct 60 (FIG. 3).

The central housing portion 104 can include an eyelet 140 extending therefrom. The eyelet 140 can define an opening 142 having an axis 144 that is parallel to the inlet port axis 114 and the outlet port axis 134. The eyelet 140 can be monolithic or integrally formed with the central housing portion 104 and can be used, for example as a grasping or mounting point, to move the supercharger 50 during assembly.

Figure 7:
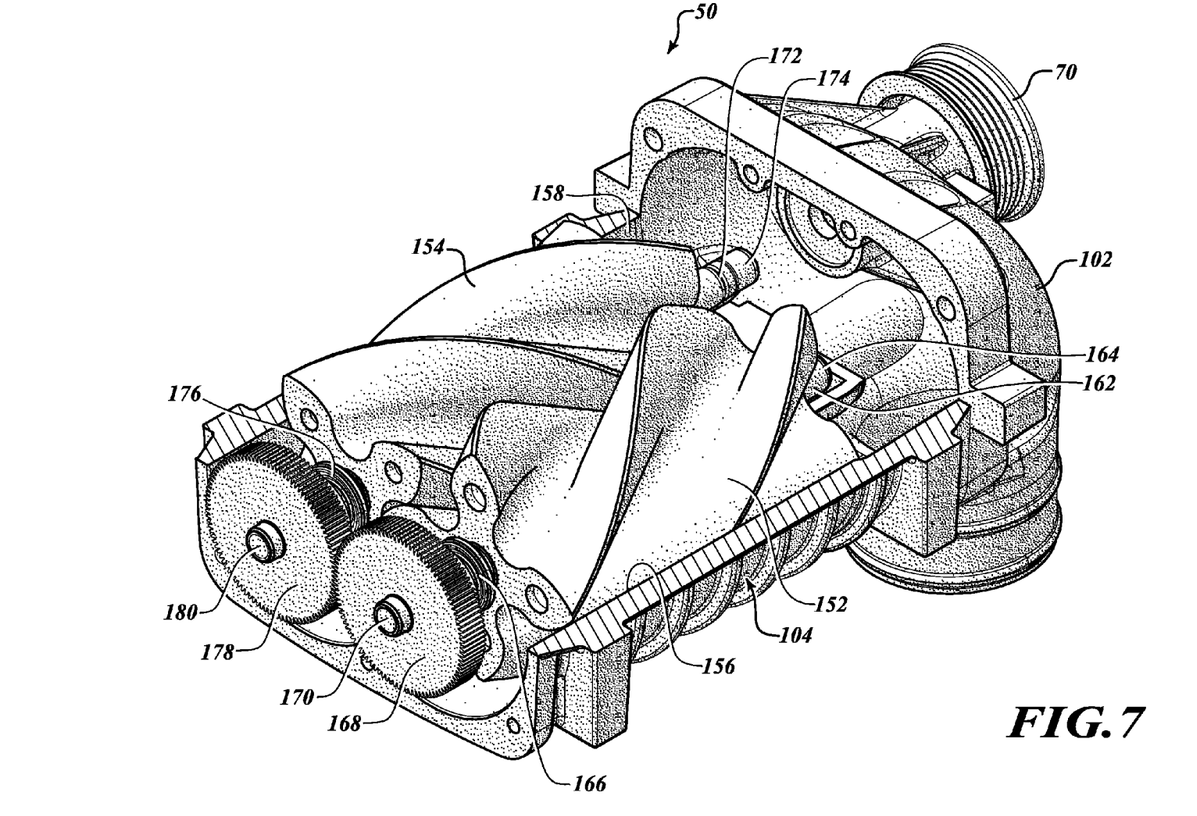
FIG. 7 is a cross-sectional view of the exemplary rotary blower taken along lines 7-7 of FIG. 6.

The supercharger 50 includes a first rotor 152 and a second rotor 154, both of which include a plurality of meshed lobes. The rotors 152 and 154 are disposed in a pair of parallel, transversely overlapping cylindrical chambers 156 and 158, respectively defined in the central housing portion 104. The rotors 152 and 154 are driven mechanically by engine crankshaft torque transmitted through the belt 66. The first and second rotors 152 and 154 are driven at a fixed ratio thereby boosting or supercharging the air flowing from the inlet port 110 to the outlet port 130.

The first rotor 152 is fixedly mounted to a first rotor shaft 162 that is journalled for rotation in the supercharger housing 100. In one example, the first rotor shaft 162 includes a first end 164. A second end 166 of the first rotor shaft 162 includes a first spur gear 168 mounted thereon. A first rotor mounting hub 170 can be formed on the first spur gear 168. The first rotor mounting hub 170 can be rotatably journalled in a corresponding bore (not specifically shown) on the rear housing portion 106.

The second rotor 154 is fixedly mounted to a second rotor shaft 172 that is journalled for rotation in the supercharger housing 100. In one example, the second rotor shaft 172 includes a first end 174. A second end 176 of the second rotor shaft 172 includes a second spur gear 178 that is meshingly engaged to the first spur gear 168 for concurrent rotation. A second rotor mounting hub 180 can be formed on the second spur gear 178. The second rotor mounting hub 180 can be rotatably journalled in a corresponding bore (not specifically shown) on the rear housing portion 106.

Figure 8:
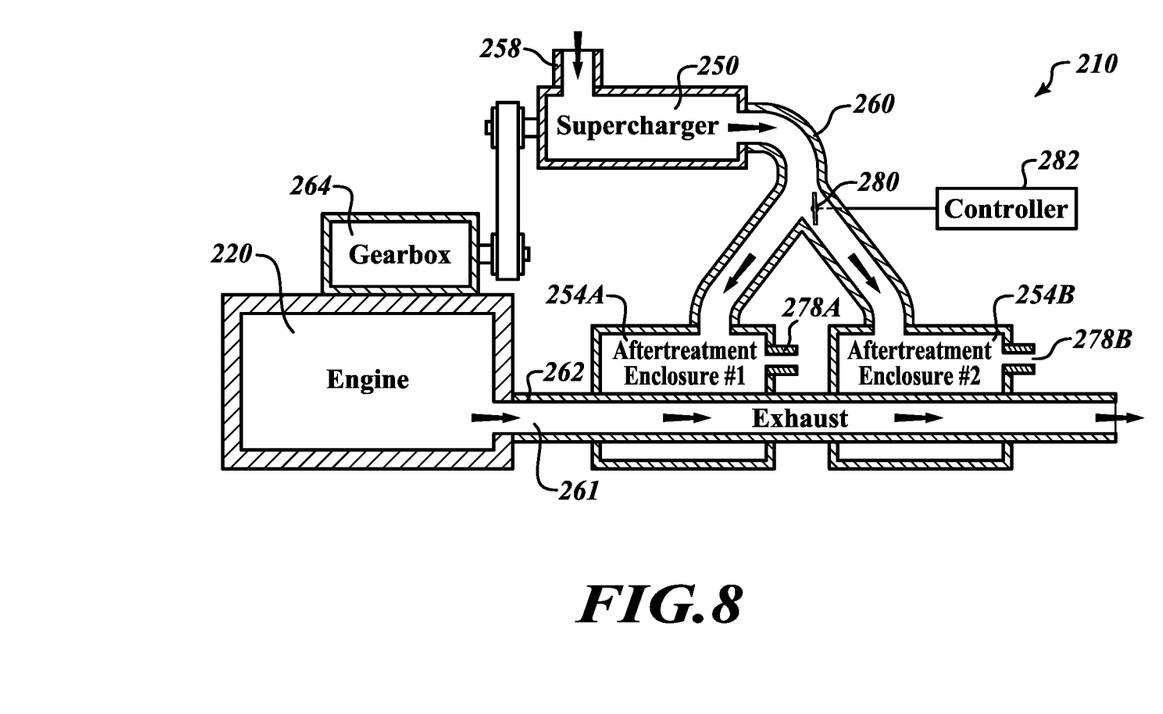
FIG. 8 is a schematic illustration of an air delivery system constructed in accordance to another example of the present disclosure that incorporates first and second aftertreatment enclosures.

With reference now to FIG. 8, an air delivery system constructed in accordance to another example of the present disclosure is shown and generally identified at reference numeral 210. The air delivery system 210 can generally include a supercharger 250 that can be configured to force air from an air intake duct 258 through a manifold 260 that directs air into a first aftertreatment enclosure 254A and a second aftertreatment enclosure 254B.

The supercharger 250 is configured to force air into both aftertreatment enclosures 254A and 254B. The operation of the aftertreatment enclosures 254A and 254B is similar to the aftertreatment enclosure 54 described above. In this example however a pair of aftertreatment enclosures are arranged in series along the exhaust 261 and are both fed air from a common supercharger 250. In the example shown in FIG. 8, a greater surface area of the exhaust duct 262 can come into contact with the cooler air being supplied from the supercharger 250. It will be appreciated that more than two aftertreatment enclosures may also be provided. In addition, other routing manifolds may be incorporated to deliver the air from the supercharger 250 to the provided aftertreatment enclosures.

As explained above, the temperature of the air being forced into the aftertreatment enclosures 254A and 254B by the supercharger 250 is cooler than a temperature of an exhaust 261 of the engine 220. The cooler air delivered from the supercharger 250 is forced against the exhaust duct 262 in the aftertreatment enclosures 254A and 254B and ultimately reduces the temperature of the exhaust 261. The supercharger 250 can be driven by a gearbox or PTU 264 extending from the engine 220 similar to the configuration described above with the supercharger 50. Vents 278A and 278B are incorporated on the aftertreatment enclosures 254A and 254B, respectively. The pressure in the aftertreatment enclosures 254A and 254B is higher than ambient. In this regard, contaminants are inhibited from entering the aftertreatment enclosures 254A and 254B. In another configuration a valve such as a butterfly valve 280 can be incorporated in the manifold 260. The butterfly valve 280 can be selectively actuated by a controller 282 for modifying the ratio of air delivered to the aftertreatment enclosures 254A and 254B.

Figure 9:
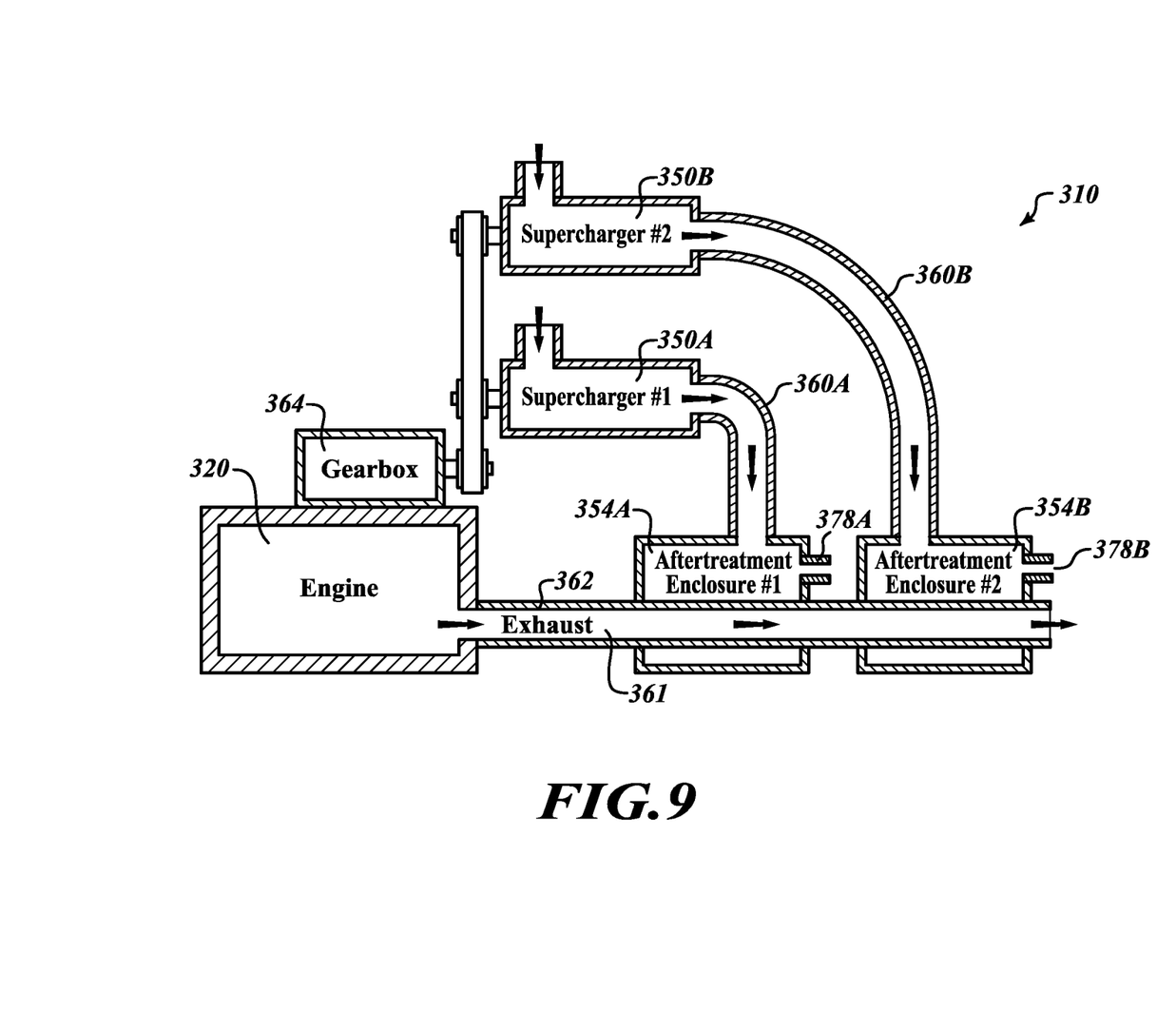
FIG. 9 is a schematic illustration of an air delivery system constructed in accordance to another example of the present disclosure that incorporates first and second aftertreatment enclosures and first and second rotary blowers.

With reference now to FIG. 9, an air delivery system constructed in accordance to another example of the present disclosure is shown and generally identified at reference numeral 310. The air delivery system 310 can generally include a first supercharger 350A and a second supercharger 350B that are both configured to force air from respective air intake ducts 358A, 358B, through outlet ducts 360A, 360B into a first aftertreatment enclosure 354A and a second aftertreatment enclosure 354B. The superchargers 350A, 350B are configured to force air into both aftertreatment enclosures 354A and 354B. It will be appreciated that more than two aftertreatment enclosures and/or superchargers may also be provided. In addition, other routing manifolds may be incorporated to deliver the air from the superchargers 350A, 350B to the provided aftertreatment enclosures.

The temperature of the air being forced into the aftertreatment enclosures 354A and 354B by the superchargers 350A and 350B is cooler than a temperature of an exhaust 361 of the engine 320. The cooler air delivered from the superchargers 350A and 350B is forced against the exhaust duct 362 in the aftertreatment enclosures 254A and 254B and ultimately reduces the temperature of the exhaust 361. The superchargers 350A, 350B can be driven by a gearbox or PTU 364 extending from the engine 320 similar to the configuration described above with the supercharger 50. Vents 378A and 378B are incorporated on the aftertreatment enclosures 354A and 354B, respectively. The pressure in the aftertreatment enclosures 354A and 354B is higher than ambient. In this regard, contaminants are inhibited from entering the aftertreatment enclosures 354A and 354B.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air delivery system for a farm machine having an exhaust duct configured to receive exhaust from an engine, the air delivery system comprising:
a first rotary blower including a housing and having a first rotor and a second rotor rotatably disposed in the housing, the first and second rotors having meshed lobes for transporting air from an inlet port to an outlet port, the first rotary blower further including a first rotor shaft and a second rotor shaft rotatably supported by the housing and having the first and second rotors, respectively, fixed for rotation therewith;
a first aftertreatment enclosure configured to receive and surround a first portion of the exhaust duct and having a first inlet, a second inlet, a first outlet, and a second outlet, wherein the first inlet receives the engine exhaust from the engine and the second inlet receives a first portion of cooling air from the rotary blower to reduce a temperature of the engine exhaust passing through the first aftertreatment enclosure, wherein the engine exhaust exits the first aftertreatment enclosure through the first outlet, and the cooling air is vented to ambient air through the second outlet; and
a second aftertreatment enclosure configured to receive and surround a second portion of the exhaust duct and having a third inlet, a fourth inlet, a third outlet, and a fourth outlet, wherein the third inlet receives the engine exhaust from the engine and the second inlet receives a second portion of cooling air to further reduce a temperature of the engine exhaust received from the first aftertreatment enclosure and passing through the second aftertreatment enclosure, wherein the engine exhaust exits the second aftertreatment enclosure through the third outlet, and the second portion of cooling air is vented to ambient air through the fourth outlet.

2. The air delivery system of claim 1, wherein the second aftertreatment enclosure is disposed downstream of the first aftertreatment enclosure such that exhaust passing through the exhaust duct is first directed through the first aftertreatment enclosure to be cooled by the first portion of cooling air, and subsequently directed through the second aftertreatment enclosure to be further cooled by the second portion of cooling air.

3. The air delivery system of claim 1 wherein the inlet port extends along an inlet port axis and the outlet port extends along an outlet port axis, wherein the inlet port axis and the outlet port axis are parallel.

4. The air delivery system of claim 3 wherein the inlet port is defined by an inlet cylinder provided on the housing, and wherein the inlet port defines a circular cross section.

5. The air delivery system of claim 3 wherein the outlet port is defined by an outlet cylinder provided on the housing, and wherein the outlet port defines a circular cross section.

6. The air delivery system of claim 3 wherein the housing comprises an eyelet extending therefrom, the eyelet defining an opening having an axis that is parallel to the inlet port axis and the outlet port axis.

7. The air delivery system of claim 1, wherein the first rotary blower supplies the second portion of cooling air.

8. The air delivery system of claim 7, further comprising a manifold coupled to the outlet port of the first rotary blower, the manifold branching into a first conduit fluidly coupled to the first aftertreatment enclosure, and a second conduit fluidly coupled to the second aftertreatment enclosure.

9. The air delivery system of claim 8, further comprising a valve disposed within the manifold, wherein the valve is actuatable to selectively modify the ratio of cooling air supplied between the first and second aftertreatment enclosures.

10. The air delivery system of claim 1, further comprising a second rotary blower including a second housing and having a third rotor and a fourth rotor rotatably disposed in the housing, the third and fourth rotors having meshed lobes for transporting air from a second inlet port to a second outlet port, the second rotary blower further including a third rotor shaft and a fourth rotor shaft rotatably supported by the second housing and having the third and fourth rotors, respectively, fixed for rotation therewith,
wherein the secondary rotary blower supplies the second portion of cooling air.

11. The air delivery system of claim 10, wherein the first portion of cooling air is generated by the first rotary blower and is only supplied to the first aftertreatment enclosure and not the second aftertreatment enclosure, and wherein the second portion of cooling air is generated by the second rotary blower and is only supplied to the second aftertreatment enclosure and not the first aftertreatment enclosure.

12. The air delivery system of claim 10, wherein the first aftertreatment enclosure is fluidly separated from the second aftertreatment enclosure.

13. The air delivery system of claim 10, wherein the first and second rotary blowers are Roots type superchargers each operably coupled to the engine by a mechanical power transfer device.

14. A farm machine comprising the air delivery system of claim 1, wherein the farm machine comprises a combine.

15. The farm machine of claim 14, wherein the combine comprises:
    a harvesting head mounted to a front end and configured to gather an agricultural crop;
    a feeder house coupled to the harvesting head and configured to receive the gathered crop therefrom;
    a conveyor configured to supply the crop from the feeder house to a combine crop processing assembly;
    a grain tank configured to receive a processed crop from the combine crop processing assembly; and
    an unloading auger configured to unload the processed crop from the grain tank.

16. A method of cooling an engine exhaust of a farm machine, the method comprising:
    providing a first rotary blower on the farm machine;
    providing a first aftertreatment enclosure on the farm machine, the first aftertreatment enclosure having a first inlet, a second inlet, a first outlet and a second outlet;
    delivering engine exhaust through an exhaust duct into the first inlet and out of the first outlet;
    delivering cooling air from the first rotary blower into the second inlet and out of the second outlet to cool the engine exhaust in the exhaust duct via indirect heat exchange;
    providing a second aftertreatment enclosure on the farm machine, the second aftertreatment enclosure having a third inlet, a fourth inlet, a third outlet, and a fourth outlet;
    delivering engine exhaust via the exhaust duct from the first aftertreatment enclosure into the second aftertreatment enclosure; and
    delivering a second portion of cooling air into the second aftertreatment enclosure to further cool the engine exhaust in the exhaust duct via indirect heat exchange.

17. A method of cooling an engine exhaust of a farm machine, the method comprising:
    providing a first rotary blower on the farm machine;
    providing a first aftertreatment enclosure on the farm machine, the first aftertreatment enclosure having a first inlet, a second inlet, a first outlet and a second outlet;
    delivering engine exhaust through an exhaust duct into the first inlet and out of the first outlet;
    delivering cooling air from the first rotary blower into the second inlet and out of the second outlet to cool the engine exhaust in the exhaust duct via indirect heat exchange;
    wherein the cooling air and the engine exhaust are maintained fluidly separated along an entire length of the exhaust duct from an engine to an exhaust outlet where the engine exhaust is exhausted to ambient air;
    providing a second aftertreatment enclosure on the farm machine;
    delivering engine exhaust via the exhaust duct from the first aftertreatment enclosure into the second aftertreatment enclosure; and
    delivering a second portion of cooling air into the second aftertreatment enclosure to further cool the engine exhaust in the exhaust duct via indirect heat exchange.

* * * * *